United States Patent Office 2,876,206
Patented Mar. 3, 1959

2,876,206

DISPERSION OF FLUOROCHLOROCARBON POLYMERS

Irving Green, Roselle, N. J., assignor, by mesne assignments, to Minnesota Mining and Manufacturing Company, St. Paul, Minn., a corporation of Delaware No Drawing. Application March 24, 1955
Serial No. 496,611

19 Claims. (Cl. 260—31.2)

This invention relates to dispersions of solid polymers of fluorochlorocarbons, such as perfluorochloroolefins. In one aspect this invention relates to dispersions or suspensions of the normally waxy and solid polymers of the single monomer trifluorochloroethylene. Another aspect of this invention relates to dispersions or suspensions of polymers of trifluorochloroethylene monomers with minor amounts of comonomers. In another aspect the invention relates to a method for applying normally solid polymers of trifluorochloroethylene to surfaces.

Polymers of trifluorochloroethylene possess certain physical and chemical characteristics which make the polymers particularly desirable as surface coatings and impregnants. The polymers of trifluorochloroethylene in general possess excellent mechanical properties, resistance to chemicals and oxidation, flame resistance, superior electrical properties and high working temperatures. The normally solid homopolymer produced from the single monomer trifluorochloroethylene is hard but not brittle and is flowable under pressure at temperatures above 225° C. Four-fifths of the weight of the homopolymer is made of the two halogens, fluorine and chlorine. The quick quenched normally solid homopolymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The normally solid homopolymer is flexible and resilient, has a high impact strength at low temperatures and is resistant to thermal shock. Such fluorocarbon polymers are not wetted by water and are unaffected by high humidity.

The normally solid homopolymer of trifluorochloroethylene may be prepared by polymerizing the monomer in the presence of a suitable organic peroxide, such as bis-trichloroacetyl peroxide, as the promoting agent at a temperature between about —20 and about 25° C., preferably at a temperature of about —16° C. At a temperature of —16° C., the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary.

To distinguish the normally solid polymer over the oils and waxes produced with the same monomer, the polymer is described by reference to its no strength temperature. A no strength temperature (N. S. T.) of between about 200 and about 350° C. is characteristic of a normally solid polymer of the above preparation having plastic characteristics. Best plastic characteristics of the normally solid polymer are observed at N. S. T. values between about 240 and about 340. The N. S. T. values of the polymer depend upon such factors as temperature, residence time, concentration of promoter, pressure, etc. As a result of the excellent chemical and physical properties of the polymers of trifluorochloroethylene, the polymers have use as protective coatings on various surfaces in order to make such surfaces corrosion resistant to chemicals. The good electrical, non-wetting and flame resistant properties of the polymer also makes its use feasible as insulating coatings on electrical conductors, condensers and various parts used in electrical apparatus and circuits. The polymer may be applied to various surfaces, including flat and curved surfaces of metals, fabrics, yarn, cables, cans, glass, glass cloth, etc. The polymer may be applied to metal wires, particularly aluminum, iron and copper, to act as an insulator on the surface of the wires. The coating of fabrics with polytrifluorochloroethylene renders the fabrics flame resistant and shrink resistant and increases the strength of the fabrics. The normally solid polymer has been applied to the surface by extrusion, and by dissolving the solid polymer in a suitable solvent, coating the surface with the solvent and subsequently evaporating the solvent. Applying the solid polymer by extrusion to the surfaces has certain obvious disadvantages. One of these disadvantages is the fact that relatively high temperatures must be employed and at such high temperatures there is a tendency for the polymer to decompose. The decomposition of the polymer not only affects its chemical and physical characteristics, but also the products of decomposition may attack the surface which is being coated. It is also difficult to obtain thin impervious films upon the surface when applying the polymer by extrusion, the use of thin films being highly desirable in coating wires used, for example, as armatures of motors. The solution method of application also has certain disadvantages. The substantial insolubility of the polymer in most solvents and its high viscosity with low solids content in other solvents makes this method somewhat impractical. Those solvents which have been found useful for dissolving plastic polytrifluorochloroethylene are relatively expensive which necessitates their recovery after evaporation. The solvents may also be corrosive to the surface being coated at the condition of application. The relatively high viscosity of solutions of plastic polytrifluorochloroethylene also makes their application difficult and the solutions must usually be applied at substantially elevated temperatures.

A more recent method of applying polytrifluorochloroethylene to a surface involves coating the surface with a dispersion of the polymer and then drying and fusing the deposited particles of polymer to form a film. Such a dispersion comprises particles of this resinous polymer in a liquid dispersing medium comprising at least one compound selected from the group consisting of aliphatic and aromatic esters and the ketones as a dispersant and an aromatic hydrocarbon as a diluent. However, these polytrifluorochloroethylene dispersions have been found to be somewhat deficient in use in that the dispersed polymer particles tend to pull or creep away from sharp edges during evaporation of the dispersing medium. Among the other disadvantages encountered, the most troublesome are the necessity for operating within a narrow viscosity range in order to accomplish complete coverage without the formation of "rivers" and the tendency of thick coatings of the film to "mud crack" during the drying or fusing operation.

It is the object of this invention to form stable nonaqueous dispersions or suspensions of normally solid polymers of fluorochloroolefins.

Another object of this invention is to provide a method for applying plastic polymers of fluorochloroolefins to surfaces.

Still another object of this invention is to provide a dispersion of the plastic polymer of trifluorochloroethylene of such composition that the dispersion may be applied to surfaces with a minimum of application difficulties.

Another object of this invention is to provide a dispersion of a plastic polymer of trifluorochloroethylene in high concentrations and low viscosities.

Another object of this invention is to provide a dispersion of a fluorochlorocarbon polymer suitable for dip coating and flow coating.

Another object of this invention is to eliminate or diminish the creep tendency of the fluorochlorocarbon plastic particles deposited during dip coating or flow coating of a dispersion of such particles.

Another object of this invention is to overcome the tendency toward the formation of rivers during the drying operation of such dispersions during application.

Still another object of this invention is to increase the evaporation rate of the dispersing medium of such a dispersion.

Various other objects and advantages of the present invention will become apparent to those skilled in the art from the accompanying description and disclosure.

According to this invention, the standard non-aqueous dispersion of normally solid polymers of perfluorochloroolefins is improved by the addition thereto of a lower boiling organic liquid modifier having not more than 3 carbon atoms per molecule. As previously stated, the standard dispersion for normally solid polymers of perfluorochloroolefins comprises an ester or a ketone as the dispersing agent and an aromatic hydrocarbon as the diluent. To this standard dispersion is added, according to this invention, an organic liquid modifier, such as acetone, which is lower boiling than any of the other constituents of the dispersion medium.

The standard dispersion to which the modifier of the present invention is added, in general, constitutes 10 to 55 weight percent of the normally solid polymer of a perfluorochloroolefin, such as a thermoplastic polymer of trifluorochloroethylene.

The dispersing agent of said dispersion is selected from the group consisting of aliphatic and aromatic esters and the ketones having at least 3 carbon atoms per molecule. Suitable ketones useful as dispersants comprise methyl isobutyl ketone, methyl ethyl ketone, di-isobutyl ketone, isophorone and cyclohexanone. Suitable esters, useful as dispersants comprise methyl acetate, ethyl acetate, butyl acetate, ethyl propionate, amyl acetate, and ethyl benzoate. The preferred dispersant is di-isobutyl ketone.

The diluent which is normally used in such dispersion is an aromatic hydrocarbon, such as xylene, toluene, or benzene. The preferred diluent is xylene. These diluents have been found to be preferred since they give good surface coverage to the resulting dispersion and are highly compatible with the dispersing agent and the plastic polymer. Although the aromatic hydrocarbons are preferred and are the principal diluents used in the standard dispersion, other organic compounds may also be used as diluents either alone or in addition to the aromatic hydrocarbons. These compounds constitute the aliphatic alcohols having 2 or more carbon atoms per molecule, such as ethyl alcohol, propyl alcohol and butyl alcohol; the unsubstituted ethers, such as dibutyl ether, substituted ethers, such as glycol ethyl ether and alcohol ether (i. e., glycol ethyl ether); and relatively high boiling hydrocarbon fractions or distillates containing a substantial amount of aromatic hydrocarbons, such as those fractions boiling above about 150° C.

The modifier which is added in accordance with this invention to the above standard dispersion is an organic liquid lower boiling than any of the constituents of the standard dispersion and has not more than 3 carbon atoms per molecule. In general, the dispersion modifier boils between 25° C. and 57° C. at atmospheric pressure. Suitable dispersion modifiers are acetone, methyl formate, fluorotrichloromethane, dichloromethane, 1,2-dichloroethylene and ethyl bromide. Acetone is preferred, when an aromatic diluent is employed and a ketone is used as the dispersing agent.

The proportions of the ingredients of the overall dispersion of polymers of perfluorochloroolefins are highly important. The various ingredients should be present in the dispersion within the following specific ranges. In general, the weight ratio of normally solid polymer:dispersing modifier:dispersing agent:diluents is 1.5–6.5:0.5–9:1:2–6 and preferably this weight ratio of the above constituents is 3.5–5.5:1.2–3.5:1:3.5–5.

The dispersions of this invention are particularly applicable to the thermoplastic polymers of trifluorochloroethylene, such as those polymers having an N. S. T. above 250° C. With this particular plastic homopolymer of trifluorochloroethylene the preferred dispersion has been found to be one containing di-isobutyl ketone as the dispersing agent, xylene as the diluent, and acetone as the modifier. These ingredients are admixed in a weight ratio of plastic:modifier:dispersing agent:diluent of about 4:2:1:4 as a highly satisfactory dispersion composition. Such a dispersion composition of the plastic homopolymer of trifluorochloroethylene has exceptionally high covering power and is further characterized by its ease of application to form homogeneous and uniform films on surfaces. Such a dispersion contains a higher percentage of plastic than the standard dispersion and in addition tends to maintain its dispersed conditions over a prolonged period of time with a minimum of settling. In the event of settling, the settled particles may be uniformly redispersed by mildly shaking and stirring.

It has been found desirable in some instances in making up the dispersion or suspension of the plastic to include a suitable plasticizer for the polytrifluorochloroethylene plastic; although very satisfactory dispersions have been made and used which do not contain an additional component as a plasticizer. The ultimate film obtained when a plasticizer is used is more resilient and pliant, with less tendency for the film to tear or scratch. Plasticizers include normally liquid and waxy polymers of trifluorochloroethylene which are of lower molecular weight than the dispersed plastic. In general, the waxes and liquid polymers are obtained at higher temperatures and with greater concentrations of promoter, usually with a chain transfer solvent, than employed in the manufacture of thermoplastic polymers. The plasticizer, as an additional constituent, is incorporated into the dispersion in a weight ratio of dispersing agent to plasticizer of between about 1:0.1 and about 1:6.5, preferably between about 1:1 and about 1:2.

Applications for the polytrifluorochloroethylene dispersions in any given field will dictate the type of dispersion selected. When high temperature resistance and chemical inertness are desired, the dispersion containing only polytrifluorochloroethylene plastic should be used. On the other hand, when coating or impregnating a heat destructible material, a dispersion having considerable polytrifluorochloroethylene wax or liquid along with the plastic should be used in order to permit lower fusion temperatures.

According to this invention, films of 0.1 to 5 mils in thickness of the normally solid homopolymer of trifluorochloroethylene may be applied to flat or curved surfaces of metals, woven fabrics, yarn, glass, glass cloth, plastics, etc.

The particle size of the polymer to be dispersed is important and should be between about 0.1 and about 10 microns. To obtain good particle size, the thermoplastic polymer of trifluorochloroethylene is ground in a mill to a sufficient extent so that the resulting powdered polymer passes an 80 mesh screen. Any known method of grinding and pulverizing the polymer may be employed (e. g., pebble mills, roller mills, colloid mills, gear mills and other conventional devices) without departing from the scope of this invention. To further reduce the particle size after this initial grinding operation, the powdered polymer is dry milled, by rotating at between about 60 and about 110 R. P. M. for a period of between about 24 and about 250 hours, preferably not more than about 72 hours.

Dispersions of the dry milled polymer may be prepared by either of two methods when plasticizer is omitted. In one case dry milled plastic polytrifluorochloroethylene powder, dispersant, diluent, and modifier are admixed in a mill for a period of between about 15 minutes and about 25 hours, after which the solids in the dispersion are allowed to settle to form a solid phase and a supernatant phase, and a determined portion of the supernatant is decanted so as to fix the concentration of solids in the final dispersion at the desired amount. This additional milling assures the proper particle size of the polymer as well as conditioning the particles in such a manner that they are dispersed.

More specifically, this method comprises the addition of between about 25 and about 35 weight percent (based on total mixture) of dry milled plastic polytrifluorochloroethylene powder to a liquid mixture containing a modifier, such as acetone, a dispersant such as di-isobutyl ketone, and a diluent such as xylene in the aforementioned weight ratio in a pebble mill where the resulting mixture is milled for a period of 3 to 5 hours. After discharging the dispersion, the solids are allowed to settle to form a solid phase and a supernatant phase, and a predetermined portion of the supernatant is decanted so that the concentration of solids in the resultant dispersion is higher, usually between about 30 and about 55 weight percent.

In an alternate method, dry milled plastic polytrifluorochloroethylene powder, dispersant and diluent are admixed in a mill for a period of between about 15 minutes and about 25 hours, after which the solids in the dispersion are allowed to settle to form a solid phase and a supernatant phase. The amount of dispersant and diluent are in the aforementioned ratio, while the plastic is added in an amount below that desired in the ultimate dispersion. A predetermined amount of the supernatant is decanted and a portion of the decanted supernatant is replaced with a suitable quantity of modifier so that the concentration of solids and other constituents in the final dispersion are adjusted to the ratios previously disclosed.

Similar dispersions involving the addition of plasticizer are prepared by either of these methods. In the first method, after the wet milling procedure has been completed, and the solids in the dispersion allowed to settle to form a solid phase and a supernatant phase, a predetermined amount of the supernatant is decanted so as to fix the concentration of solids in the final dispersion at between about 30 and about 55 weight percent. An additional excess of supernatant is also decanted into which a desired amount of plasticizer in the aforementioned weight ratio of plasticizer to dispersant is dissolved. The excess portion of decanted supernatant, containing plasticizer is then returned to the dispersion.

In the alternate method, after the solids in the milled dispersion have been allowed to settle to form a solid phase and a supernatant phase, a predetermined amount of supernatant is decanted, allowing for subsequent partial replacement with modifier, so as to fix the concentration of solids in the final dispersion at between about 30 and about 55 weight percent. An additional excess of supernatant is also decanted into which the desired amount of plasticizer (e. g., polytrifluorochloroethylene wax) and modifier is dissolved. The excess decanted supernatant, containing plasticizer and modifier, is then returned to the dispersion.

The present invention includes within its scope, copolymers of trifluorochloroethylene which include a minor amount of other ethylenically unsaturated monomers such as vinyl chloride, vinyl fluoride, vinylidene chloride, vinylidene fluoride, tetrafluoroethylene, trifluoroethylene, hexafluoropropene, perfluorobutadiene, and others. The use of these other comonomers is preferably limited to an amount less than about 15 weight percent in the polymer, otherwise the polymer becomes at least partially soluble in the dispersion. In some instances, it is desirable to use small quantities of such other comonomers in combination with the principal trifluorochloroethylene monomer in order to impart modified characteristics to the resulting polymer.

Articles may be coated with discrete particles by dipping them into the above dispersions, allowing the excess to drain off, and air drying the treated surface. The air drying process may be hastened by directing a moving current of air over the treated surface. After each dip the surface containing the deposited solid polymer thereon is air dried and heated to a temperature of at lease 200° C., preferably between about 240° C. and about 300° C., for a period of between about 30 seconds and about one hour, to cause fusion and sintering of the solid powdered particles of polymer. Shorter periods of time within the above range are permissible with higher temperatures of fusion. When plasticizers are employed the temperature of fusion may be as low as 200° C. The lower temperatures of fusion are preferred since the tendency of the polymer to decompose and attack metal surfaces is minimized. A coating of not more than about one to two mils in thickness can be obtained by a single dip. Two, three or more dips, with air drying and fusing between dips, is generally required to obtain the desired film thickness upon the surface to be coated.

The dispersions prepared in this invention can also be applied by the "slush" or flow method in which method the liquid dispersion mixture is poured onto the surface to be coated and excess liquid is allowed to drain off; or, if container surfaces are being coated, the liquid dispersion mixture is poured into the container insuring coverage of all inner surfaces and the excess liquid is allowed to drain out from the container. The dispersion is air dried and the residual discrete particles are subjected to fusion. It may be desirable, following fusion, to lower the temperature at a slow rate, giving better adhesion. For example, lowering the temperature about 2 to 10° C. per minute gives a highly adhesive film on a metal surface. On the other hand, when flexibility and toughness are required, a quick quench of the fused film will be necessary to obtain an essentially amorphous polymer.

Fillers, as for example, pigments and polymer stabilizers, may be added to the completed dispersion with gentle stirring or by addition prior to the grinding operation in the pebble mill. Examples of stable fillers are titanium dioxide, calcium silicate, calcium carbonate, carbon black, etc., with particle dimensions of approximately 0.5 to 10 microns in diameter. Cadmium pigments and pigments such as the phthalocyanines and chrome green can also be incorporated in the polytrifluorochloroethylene dispersions.

The following examples are offered as a better understanding of the dispersion composition and method of making same and should not be construed as unnecessarily limiting to the invention.

*Example 1*

In this example, 361 grams of 280 N. S. T. polytrifluorochloroethylene plastic (through 80 mesh screen) is dry milled at 72 R. P. M. in a gallon pebble mill containing 8 pounds of A-1 flint pebbles for 65 hours. To this the following charge is added:

| | Grams |
|---|---|
| Xylene | 550.3 |
| Di-isobutyl ketone | 120.8 |
| Acetone | 304.9 |

The jar containing the above charge is rotated at 72 R. P. M. for 4 hours after which the dispersion is discharged and the solids are allowed to settle. At this stage, 275 grams of the supernatant (56.4 weight percent xylene, 12.4 weight percent di-isobutyl ketone, and 31.2 weight percent acetone) is removed by decantation and the following dispersion composition is obtained:

| | |
|---|---|
| Polytrifluorochloroethylene homopolymer. | 361 grams or 34 weight percent. |
| Xylene | 395.5 grams } or 45.4 weight percent. |
| Di-isobutyl ketone | 86.8 grams |
| Acetone | 218.7 grams or 20.6 weight percent. |

This dispersion containing 34 weight percent polytrifluorochloroethylene flows readily and gives complete visual coverage of glass or metal surfaces whether applied by "dip" or "flow" coating methods. The treated surface is then air dried and the residual solid particles fused thereon. A tough continuous and adhesive coating providing excellent chemical resistance to a glass surface and good electrical insulation to a metal is obtained.

*Example 2*

A charge of 180 pounds of 300 N. S. T. polytrifluorochloroethylene plastic (through 80 mesh screen) is charged to a 233 gallon pebble mill and rotated for 72 hours. A charge of 257.2 pounds of xylene, 66.8 pounds of di-isobutyl ketone and 162 pounds of acetone is then added to the mill, rotated for about 4 hours and discharged. The dispersion is allowed to settle and 141 pounds of supernatant liquid is decanted. After the decantation, 60 pounds of polytrifluorochloroethylene wax is dissolved in a portion of the liquid decanted, containing 5 pounds of acetone and 10 pounds of thinner (80 weight percent xylene and 20 weight percent di-isobutyl ketone) and the solution obtained is added to the dispersion. The resultant composition is as follows:

| | |
|---|---|
| Polytrifluorochloroethylene (300 N. S. T. plastic). | 180 pounds } or 40 weight percent. |
| Polytrifluorochloroethylene (150° C. M. P.) wax. | 60 pounds |
| Acetone | 120 pounds or 20 weight percent. |
| Xylene-di-isobutyl ketone mixture. | 240 pounds or 40 weight percent. |

*Example 3*

From 699 grams of 280 N. S. T. polytrifluorochloroethylene plastic and xylene di-isobutyl ketone mixture at 34 percent solids, 140 grams of supernatant (80 weight percent xylene and 20 weight percent di-isobutyl ketone) was decanted and a solution of 79.2 grams of polytrifluorochloroethylene wax, M. P. 150° C., dissolved in 140 grams of acetone was added to the dispersion.

The resulting dispersion composition was:

| | |
|---|---|
| Polytrifluorochloroethylene plastic. | 237.5 grams } or 40.7 weight percent. |
| Polytrifluorochloroethylene wax. | 79.2 grams |
| Acetone | 139.8 grams or 18.0 weight percent. |
| Xylene and di-isobutyl ketone mixture. | 321.5 grams or 41.3 weight percent. |

*Example 4*

From 479 grams of finely divided 270 N. S. T. polytrifluorochloroethylene plastic and xylene di-isobutyl ketone mixture at 34 percent solids, 128.3 grams of supernatant (80 weight percent xylene and 20 weight percent di-isobutyl ketone) was decanted. A solution of 54.3 grams of polytrifluorochloroethylene 150° C. M. P. wax dissolved in 101.2 grams of acetone was added to the above dispersion.

The final dispersion composition was:

| | |
|---|---|
| Polytrifluorochloroethylene plastic. | 162.9 grams } or 42.9 weight percent. |
| Polytrifluorochloroethylene wax. | 54.3 grams |
| Acetone | 101.2 grams or 20 weight percent. |
| Xylene and di-isobutylketone mixture. | 187.8 grams or 37.1 weight percent. |

The dispersion had good covering power and gave an ultimate coating having uniformly and good adhesion to iron surfaces.

*Example 5*

A charge of 153.5 grams of polytrifluorochloroethylene 290 N. S. T. plastic and 733.5 grams of dispersing medium (xylene:di-isobutyl ketone in a weight ratio of 4:1) was milled in a pebble mill. After the dispersion was discharged and the solids were allowed to settle, 170:7 grams of supernatant was decanted and 51.2 grams of molten polytrifluorochloroethylene 120° C. M. P. wax was stirred into the dispersion together with 76.8 grams of acetone. The resultant dispersion had the following composition:

| | |
|---|---|
| Polytrifluorochloroethylene plastic | 153.5 grams or 18.2 weight percent. |
| Polytrifluorochloroethylene wax | 51.2 grams or 6.1 weight percent. |
| Xylene and di-isobutyl ketone | 562.8 grams or 66.6 weight percent. |
| Acetone | 76.8 grams or 9.1 weight percent. |

This dispersion was capable of laying down a continuous and uniform coat of plastic on a suitable surface. The dispersed particles on the surface could be fused at about 200° C. to form the coat.

*Example 6*

A charge of 180 grams of 300 N. S. T. polytrifluorochloroethylene plastic and 720 grams of dispersing medium (xylene:di-isobutyl ketone in a weight ratio of 4:1) was milled in a pebble mill. After the dispersion was discharged and the solids were allowed to settle 195 grams of supernatant was decanted and 60 grams of polytrifluorochloroethylene 150° C. M. P. wax together with 135 grams of acetone was stirred into the dispersion. The resulting dispersion had the following composition:

| | |
|---|---|
| Polytrifluorochloroethylene plastic | 180 grams or 20 weight percent. |
| Polytrifluorochloroethylene wax | 60 grams or 6.7 weight percent. |
| Dispersing medium | 525 grams or 58.3 weight percent. |
| Acetone | 135 grams or 15.0 weight percent. |

Thin polytrifluorochloroethylene plastic coatings made from this dispersion possessed good mechanical and electrical properties and good chemical resistance.

The substitution of methyl formate, 1,2-dichloroethylene, dichloromethane, fluorotrichloromethane or ethyl bromide for acetone as the modifier in the above examples shows satisfactory improvement in the dispersion similar to the effect of acetone.

Temperature stable fabrics and ceramic sheets coated with trifluorochloroethylene polymers are used as jackets for the insulation of wire and cable. The fabrics, such as glass cloth, asbestos, etc., are applied in the form of tapes, sheets, or braids. For high temperature resistance insulators the straight polytrifluorochloroethylene plastic dispersion is used to coat the wrapping. Polytrifluorochloroethylene wax dispersions may be used in applications where high temperature resistance is not needed. A final polytrifluorochloroethylene coat may be placed over the wrapped wire, if desirable.

The dispersions may be used to coat individual or multiple strands in lengths or on windings directly by dip method followed by fusion at elevated temperatures. These dispersions are of particular value because they permit a ratio of the film dielectric strength to film thickness higher than that of other insulating materials. Also of value are the excellent electrical characteristics, low moisture absorption, and good chemical resistance of the resulting polytrifluorochloroethylene coating. A specific example is coating of copper magnet wire for motor armatures and generators.

The dispersions may be used as saturants for the treatment of asbestos braids employed on a number of small power cables, switchboard, and stove wires.

Dispersions of polytrifluorochloroethylenes are particularly useful in thin-walled electrical insulation, coating of electrical assemblies such as condensers, resistors, and the like, requiring low moisture absorption and high heat distortion point.

Protection of metal against the various service conditions to which it may be exposed is solved in numerous cases by coating the exposed surface with polytrifluorochloroethylene plastic applied from dispersion. A specific example is the coating of large gate valves made of steel. Another example is the coating of the inside of an aluminum tank with polytrifluorochloroethylene wax-plastic dispersion so that it will withstand the action of white-fuming and dilute nitric acid and vapors at temperatures up to 80° C.

The above dispersions are especially suited for the coating of metal cans, since this inert film formed does not impart odor, color, or taste to the can ingredients.

Various modifications of the specific ratio of components of the composition of this invention may become apparent to those skilled in the art without departing from the scope of this invention. This invention constitutes an improvement of present non-aqueous or organic dispersions of the thermoplastic polymer of trifluorochloroethylene by the addition of a specific modifier thereto.

Having described my invention, I claim:

1. A non-aqueous dispersion which comprises a solid polymer of a trifluorochloroethylene admixed with a liquid dispersing medium comprising at least one compound selected from the group consisting of acetone, methyl formate, 1,2-dichloroethylene, dichloromethane, fluorotrichloromethane and ethyl bromide as a modifier, at least one higher boiling compound with respect to the modifier selected from the group consisting of the organic esters and ketones as a dispersant, and a diluent selected from the group consisting of the aromatic hydrocarbons and the normally liquid aliphatic alcohols having at least two carbon atoms per molecule, the weight ratio of solid polymer:modifier:dispersant:diluent being 1.5–6.5:0.5–9:1:2–6.

2. A non-aqueous dispersion which comprises a plastic polymer of trifluorochloroethylene admixed with a liquid dispersing medium comprising acetone as a modifier, a ketone having a boiling point higher than acetone as a dispersant, and an aromatic hydrocarbon as a diluent, the weight ratio of solid polymer:modifier:dispersant:diluent being 1.5–6.5:0.5–9:1:2–6.

3. A non-aqueous dispersion which comprises a plastic polymer of trifluorochloroethylene admixed with a liquid dispersing medium comprising at least one compound selected from the group consisting of acetone, methyl formate, 1,2-dichloroethylene, dichloromethane, fluorotrichloromethane, and ethyl bromide as a modifier, at least one higher boiling compound with respect to the modifier selected from the group consisting of the organic esters and the ketones as a dispersant, and a diluent selected from the group consisting of the aromatic hydrocarbons and the normally liquid aliphatic alcohols having at least two carbon atoms per molecule, the weight ratio of solid polymer:modifier:dispersant:diluent being 1.5–6.5:0.5–9:1:2–6.

4. A non-aqueous dispersion which comprises a plastic polymer of trifluorochloroethylene admixed with a liquid dispersing medium comprising acetone as a modifier, a ketone having a boiling point higher than acetone as a dispersant, and an aromatic hydrocarbon as a diluent, the weight ratio of solid polymer:modifier:dispersant:diluent being 1.5–6.5:0.5–9:1:2–6.

5. A non-aqueous dispersion which comprises a plastic polymer of trifluorochloroethylene admixed with a liquid dispersing medium comprising at least one compound selected from the group consisting of acetone, methyl formate, 1,2-dichloroethylene, dichloromethane, fluorotrichloromethane, and ethyl bromide as a modifier, at least one higher boiling compound with respect to the modifier selected from the group consisting of the organic esters and ketones as a dispersant, and a diluent selected from the group consisting of aromatic hydrocarbons and the normally liquid aliphatic alcohols having at least two carbon atoms per molecule as a diluent, the weight ratio of plastic polymer:modifier:dispersant:diluent being 1.5–6.5:0.5–9:1:2–6.

6. The dispersion of claim 5 in which said dispersant is di-isobutyl ketone.

7. The dispersion of claim 5 in which said dispersant is methyl isobutyl ketone.

8. The dispersion of claim 5 in which said dispersant is methyl ethyl ketone.

9. The dispersion of claim 5 in which said dispersant is methyl acetate.

10. The dispersion of claim 5 in which said dispersant is butyl acetate.

11. The dispersion of claim 5 in which said diluent is xylene.

12. The dispersion of claim 5 in which said diluent is glycol ethyl ether.

13. The dispersion of claim 5 in which said diluent is benzene.

14. The dispersion of claim 5 in which said diluent is toluene.

15. The dispersion of claim 5 in which said diluent is butyl alcohol.

16. A non-aqueous dispersion which comprises finely divided particles of the plastic polymer of trifluorochloroethylene dispersed in a liquid medium comprising acetone, di-isobutyl ketone and xylene, the weight radio of plastic: acetone:di-isobutyl ketone:xylene being 3.5–5.5:1.2–3.5:1:3.5–5.

17. The method for preparing a non-aqueous dispersion of plastic polytrifluorochloroethylene which comprises subjecting the plastic polytrifluorochloroethylene to dry milling for a period of time between about 24 and about 250 hours, adding to the resulting plastic powder, acetone as a modifier, a ketone dispersant having a higher boiling point than acetone and an aromatic hydrocarbon diluent in a weight ratio of 0.5–9:1:2–6, milling the resultant mixture for a period of between about 15 minutes and about 25 hours, allowing the solid particles in the dispersion thereby obtained to settle to form a settled phase and a supernatant phase, and decanting a portion of the supernatant until the concentration of solids in the dispersion is fixed at between about 30 and about 55 weight percent.

18. The method for preparing a non-aqueous dispersion of plastic polytrifluorochloroethylene which comprises subjecting the plastic polytrifluorochloroethylene to dry milling for a period of time between about 24 and about 250 hours, adding to the resulting plastic powder an admixture of acetone, a ketone having a higher boiling point than acetone and an aromatic hydrocarbon in a weight ratio of 0.5–9:1:2–6, milling the resultant mixture for a period of between about 15 minutes and about 25 hours, allowing the solid particles in the dispersion thereby obtained to settle to form a settled phase and a supernatant phase, and decanting a portion of the supernatant in order to fix the concentration of solids in the dispersion at between about 30 and about 55 weight percent.

19. A method for preparing a non-aqueous dispersion of plastic polytrifluorochloroethylene which comprises subjecting the plastic polytrifluorochloroethylene to dry milling for a period of time between about 24 and about 250 hours, admixing the resulting plastic powder with a mixture of a ketone dispersant having a boiling point higher than acetone and an aromatic hydrocarbon diluent in a weight ratio of 1:2-6 by milling for a period of between about 15 minutes and about 25 hours to form a dispersion, allowing the solid particles in the dispersion to settle to form a settled phase and a supernatant phase, decanting a portion of the supernatant, and replacing a portion of the decanted supernatant with acetone in an amount so that the concentration of solids in the dispersion is adjusted to between about 30 and about 55 weight percent and the acetone is present in a weight ratio of acetone:dispersant of 0.5-9:1.

References Cited in the file of this patent
UNITED STATES PATENTS

| | | |
|---|---|---|
| 2,656,330 | Sprung | Oct. 20, 1953 |
| 2,686,738 | Teeters | Aug. 17, 1954 |
| 2,770,615 | Kroncke | Nov. 13, 1956 |